US005307231A

United States Patent [19]

Smith

[11] Patent Number: 5,307,231

[45] Date of Patent: Apr. 26, 1994

[54] WEATHERPROOF STATION PROTECTION MODULES

[75] Inventor: Thomas J. Smith, Bay Shore, N.Y.

[73] Assignee: TII Industries, Inc., Copiague, N.Y.

[21] Appl. No.: 857,226

[22] Filed: Mar. 25, 1992

[51] Int. Cl.[5] .............................................. H02H 1/00

[52] U.S. Cl. .................................... 361/127; 361/117; 361/56

[58] Field of Search ..................... 361/56, 55, 99, 105, 361/127

[56] References Cited

U.S. PATENT DOCUMENTS 4,447,848 5/1984 Smith ................................ 361/124
4,624,518 11/1986 Seidel .............................. 339/97 P
4,675,778 6/1987 Cwirzen ............................ 361/129
4,705,340 11/1987 Loose ................................ 439/395

*Primary Examiner*—Todd DeBoer
*Attorney, Agent, or Firm*—Sachs & Sachs

[57] ABSTRACT

A weatherproof station protector module for communication systems includes a hollow housing on which is disposed a pair of weatherproof line terminals that extend into the hollow housing and a ground terminal. A holding assembly is affixed to the ground terminal within the hollow housing and is adapted to receive a surge arrester therein. The surge arrester may be a three terminal device or a pair of two terminal arresters with one electrode of each connected to the ground terminal and each one of the other electrodes being connected to a line terminal. The holding assembly for the surge protector may include a thermally sensitive material disposed between the surge arrester ground electrode and the line connections, thereby providing both overheat protection by positively shorting the line terminals to ground if the overvoltage protection should overheat as well as providing back-up surge arrester protection by means of a back-up air gap provided by a dielectric disposed between the line terminals and the ground connection. The unit is completely sealed and therefore impervious to the weather.

17 Claims, 5 Drawing Sheets

WEATHERPROOF STATION PROTECTION MODULES

BACKGROUND OF THE INVENTION

1. Field of the Invention

The present invention relates to overload protectors for communications systems and in particular, to overvoltage protection devices that are impervious to the weather which also may include back-up and overheat protection.

2. Discussion of the Relevant Art

In communication systems, such as telephone systems, it is necessary to position overload protectors at various positions to protect sensitive parts of the system and to protect equipment attached to the line from lightning strikes or other causes of overvoltage appearing on the communication lines. Typically these overvoltage protection devices incorporated the carbon block type which provided a parallel air spark gap that would break down at a predetermined voltage. However, the carbon block protectors would degrade during normal operation on the communication line and cause static to appear thereon. Later, gas protection devices which used thermally sensitive plastics were assembled with spring pressure on them and thus, when overheated would yield and short the terminal line to ground.

With the inherent desire to protect the communication equipment several different types of protectors have been used over the years, each including thermally active members which when overheated causes the line terminals to short to ground (fail short). Initially the thermally sensitive material was a low temperature melting solder pellet, which when melted because of extreme heat caused by an overvoltage, would permit the housing in some manner to short the line terminal to ground. Further improvements in the state of the art replaced the solder pellet used with the gas filled tube. Still further improvements of the protection devices, which proved to be more reliable utilized a back-up air gap together with the thermally sensitive material used for overheating protection in the assemblies.

U.S. Pat. No. 5,224,013, issued Jun. 29, 1993 to Emanual J. Pagliuca and entitled "Miniature Station Protector Modules" overcame the shortcomings of the prior art in most respects, however, that device was not weatherproof since the line terminals were completely exposed to the environment.

Moreover, all of the known devices required that the technician in replacing any of the components after a lightning strike or overvoltage condition to carefully replace the components as it was originally assembled so that the protection would be restored. This type of assembly work performed in the field proved to be a handicap and thus it was found more desirable to provide a device which is completely sealed and when it has provided its useful protection is just thrown away and replaced with a new unit. This, of course, became feasible only with the advent of inexpensive thermally sensitive plastics and a new type of construction which reduced the cost of the protection device.

In addition, it was a design goal to make the assembly weatherproof or impervious to weather conditions so that the units that were installed on the outside of buildings and/or exposed to the environment would not inadvertently cause shorts to the telephone terminal lines by providing a moisture path to ground.

Therefore, it is an object of the present invention to provide a weatherproof station protector module for communication system which is completely sealed and may be disposed of once it has served its purpose for protecting the communication line.

It is another object of the present invention to provide a weatherproof station protector module which combines all of the features of the earlier type devices including fail-safe shorting, with a back-up air gap arrangement that is coupled to the line terminals, highly stable and efficient, as well as being inexpensive to manufacture.

It is still a further object of the present invention to provide a weatherproof station protector module which is capable of using a gas tube surge protector device as well as, solid state protector devices.

The foregoing and other object and advantages will appear from the description to follow. In the description reference is made to the accompanying drawing which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the spirit and scope of the invention. The following detailed description is, therefore, not to be taken in a limiting sense, and the scope of the present invention is best defined by the appended claims. Like reference characters have been utilized to designate like or corresponding components in the alternative embodiments in order for the reader to better understand the invention.

SUMMARY OF THE INVENTION

A weatherproof station protector module for communications systems, according to the principles of the present invention comprises a hollow housing having a top surface and an open bottom. A pair of weatherproof line terminals are disposed on the top surface extending into the hollow housing together with a ground terminal. A holding assembly is affixed to the ground terminal within the hollow housing and is adapted to receive a surge arrester either of the gas tube type or a pair of solid state devices. The surge arrester must have at least a pair of electrodes. One of the electrodes is in electrically conductive contact with the ground terminal. The other of the electrodes is in electrically conductive contact with one of the pair of line terminals. A potting or sealing grease fills the air gaps within the hollow housing and/or a cover may be utilized to seal off the open bottom.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENTS

Figure 1:
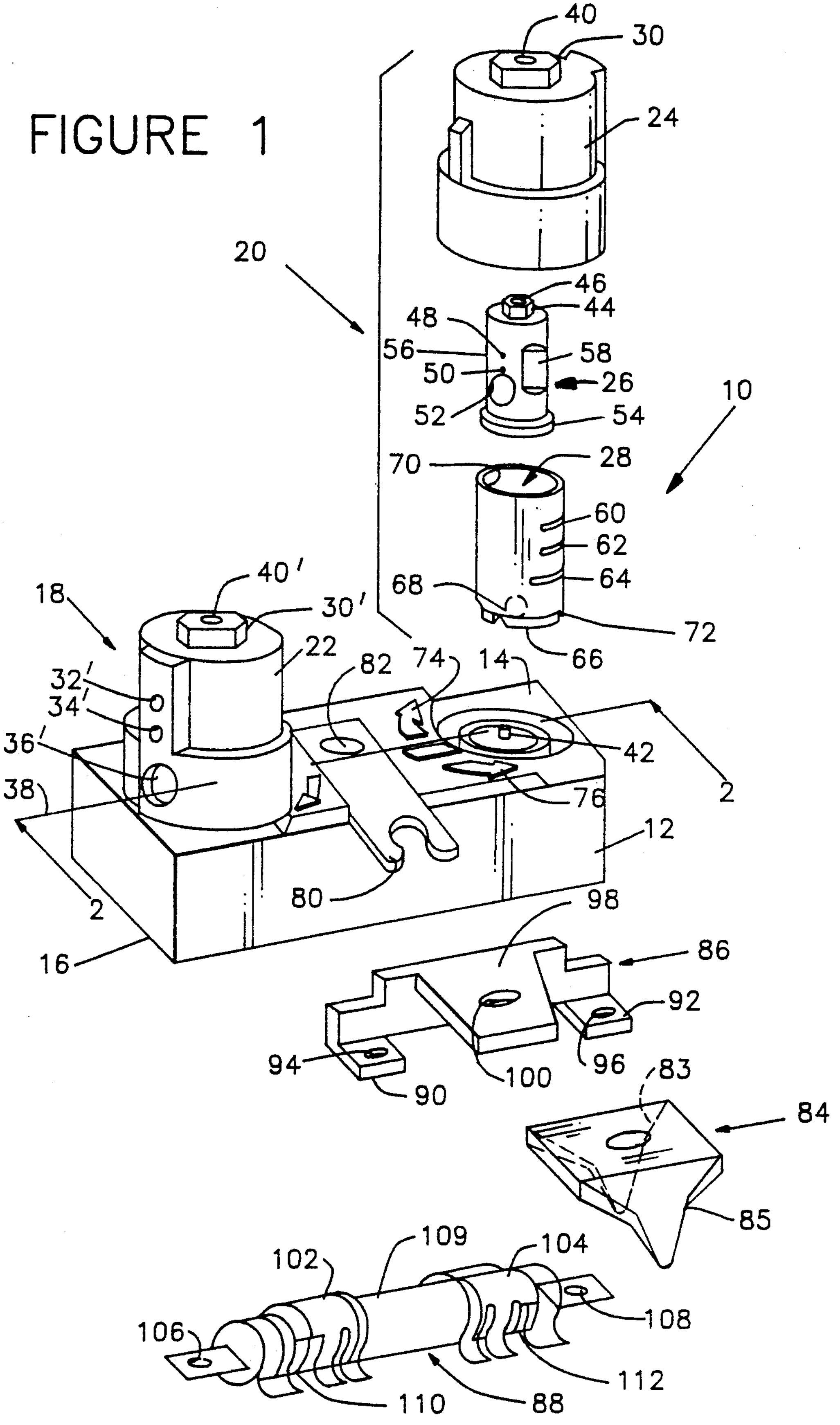
FIG. 1 is a partially exploded isometric view, according to the principles of the present invention, of a weatherproof station protector module.
Figure 2:
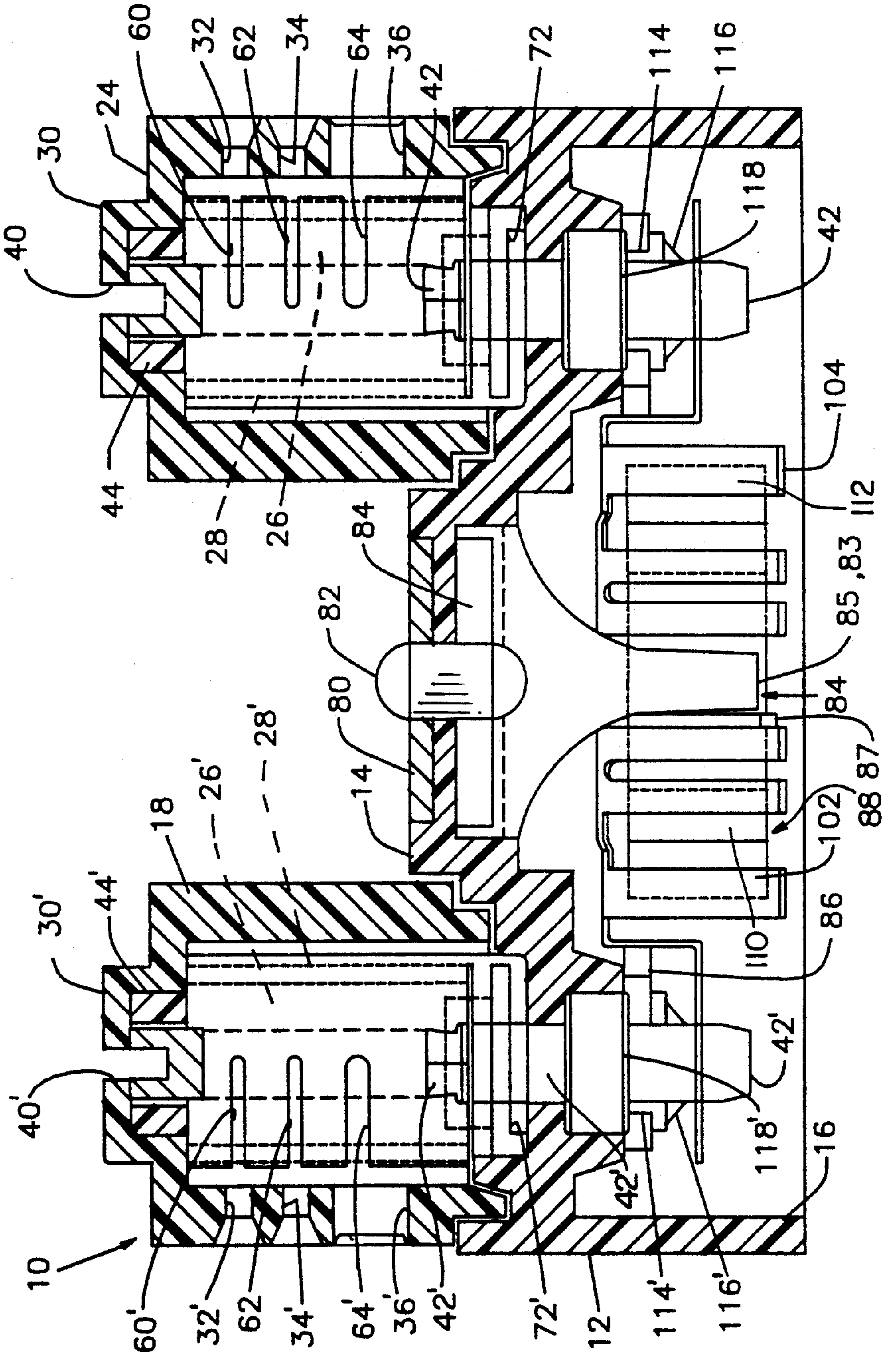
FIG. 2 is an enlarged cross-sectional view in elevation taken along the line 2—2 of FIG. 1.

Referring now to the figures, and in particular to FIGS. 1 and 2, in which there is shown one embodiment of a weatherproof station protector module 10 that includes a hollow housing 12 having a top surface 14 and an open bottom 16. Disposed on the top surface 14 are a pair of weatherproof line terminals 18 and 20 onto which are connected the telephone company's communication lines, not shown, by means of an insulated caps 22 and 24.

Weatherproof terminal 20 is shown exploded and is seen to contain insulated member 26 and electrically conductive member 28. Although terminal 20, which is shown in an exploded view will be described in detail, one must be made aware of the fact that terminal 18 includes the same number of components disposed in a similar manner. Insulated cap 24 is preferably provided with a hexagonally shaped portion 30 (nut) which is an integral part thereof and a plurality of apertures 32, 34 and 36, shown more clearly on line terminal 18 as 32', 34' and 36'; since the apertures 32, 34 and 36 are not visible on insulated cap 24. These apertures face in a direction which is parallel to the longitudinal axis 38 of the elongated hollow housing 12. Insulated cap member 22 includes an aperture 40 centrally disposed in the nut shaped portion 30 which may be provided with an electrically conductive path by extending terminal stud member 42 up through conductive member 28 and insulated member 26 to the nut portion 30 of cap 24.

Insulated member 26 is also provided with a nut shaped portion 44 that includes a through aperture 46 and is preferably cylindrically shaped and adapted to be frictionally held within the underside of the nut shaped portion 30 of cap member 24 or alternatively may be held in position by the end of terminal stud member 42 when it is peened over in a conventional manner.

Cylindrically shaped insulator 26 is shown rotated 180 degrees in order that apertures 48, 50 and 52 may be visible. Additionally a ledge portion 54 is provided on the insulated member 26 whose function will be explained shortly. A pair of flat portions 56 and 58 is provided along the sides of insulated member 26, as will be explained hereinafter.

Electrically conductive member 28 is preferably cylindrically shaped and includes three slots 60, 62 and 64 which are provided with cutting edges that are designed to remove the insulation from wires inserted therein. Extended portion 66 provided on electrically conductive member 28 has a centrally disposed aperture 68 adapted to receive terminal stud member 42 therein. If a test terminal is not to be provided then the stud member would be peened over retaining the extended portion 66 of the electrically conductive member 28 so that it may be fixed in position. It is to be noted that apertures 32, 34 and 36 provided in cap insulated cap member 24 is placed in alignment with apertures 48, 50 and 52, and slots 60, 62 and 64, respectively so that if a wire is inserted into aperture 32, 34 and 36 it may enter and go clear through the conductive member 28 as well as insulated cap 24 and insulated member 26 which is adapted to be received into the opening 70 provided in the electrically conductive member 28. Once the electrically conductive member 28 is peened or connected to terminal 42 it is locked into position. Inserting insulated member 26 therein by forcing it into position allows the ledge portion 54 to expand out into the opening 72 provided by the extending portion 66, provided on the conductive member 28, therefore, prohibiting it from being removed from the conductive member 28. The insulated cap member 24 is force-fit over the insulated member 26 holding it in place.

In operation, once the unit has been assembled inserting wires into the apertures as stated earlier and rotating the cap clockwise or counterclockwise as shown by the arrows 74 and 76 will cause the knife edge portions provided on the slots 60, 62 and 64 to cut through the insulation of the wires inserted therein, thus making electrically conductive contact between the wires and terminal stud member 42.

A ground terminal 80 is disposed on the top surface 14 of the housing 12 and makes electrically conductive contact by means of a rivet or stud 82 which has connected thereto conductive finger member 84 that has a pair of fingers 83 and 85 adapted to receive overvoltage protection device 88 therebetween. The overvoltage protection device 88 may be a single gas tube three terminal device where the fingers are coupled to the ground terminal or it may be a pair of solid state devices which have one set of terminals coupled to the finger member 84.

A bracket 86 is also mounted on studs 42 and 42' by means of tab portions 90 and 92 having apertures 94 and 96 adapted to receive studs 42' and 42, respectively and tab portion 98 having aperture 100 provided therein adapted to be received by ground stud 82 as will be explained in more detail hereinafter.

An additional pair of gripping brackets 102 and 104 having apertures 106 and 108, respectively provided thereon, are adapted to be received by studs 42' and 42, respectively engage and retain the overvoltage protection device 88 and may have included between the overvoltage protection device terminals 110 and 112 a heat sensitive thermoplastic known as FEP manufactured by DuPont disposed therebetween (more clearly shown in FIG. 2).

Referring now specifically to FIGS. 1 and 2, where it can be readily seen that the rivet or stud 82 extends into the hollow portion of the housing 12 and is connected in a conventional manner by forming the rivet 82 to maintain the ground terminal 80 and the fingers 83 and 85 of the finger member 84 in their rigid electrical conducting manner sufficient for the fingers 83 and 85 to provide a conductive ground to the centrally disposed terminal 87 of the overvoltage device 88. The other electrodes 110 and 112 of overvoltage protection device 88 are connected to the line terminals 42 and 42', respectively.

Disposed between the fingers on the gripping brackets 102 and 104 is a heat sensitive plastic material that permits the fingers on bracket 102 and 104 to short to ground should the thermal device overheat for any reason. Brackets 102 and 104 are force fit and frictionally held on the terminals 42 and 42', which in turn will be connected to the communication lines, not shown, via the terminals 18 and 20, as will be explained hereinafter.

Ground bracket 86 has one portion 90, and the other portion 96 placed over terminals 42' and 42, respectively, however no contact is made with these terminals since they are insulated therefrom by insulated spacers 114 and 114', which are held in place by captive nuts 116 and 116', respectively, which when they are forced onto terminals 42 an 42' maintain the Kapton spacers 118 and 118', which function as the overvoltage back-up air gap device, should the overvoltage protection device 88 fail for any reason. Kapton is a trademark of the DuPont Corporation of Delaware and may be purchased from them. The Kapton is approximately 3 mils in thickness.

After the unit is completely assembled the portion including the overvoltage protection device may be filled with an insulating epoxy and the caps 20 and 24 are prefilled with gel or grease, in a conventional manner. Once the wires are inserted through the apertures 32, 34 or 36 or 32', 34' or 36' leading from the respective communication lines that are to be protected by the areas that have been filled with the protective grease or gel. The apertures 40 and 40' function as test terminals and once assembled may also be filled with grease, which may be pierced by a test probe when required.

The overvoltage protection device disclosed is weatherproof and impervious to the elements.

Figure 3:
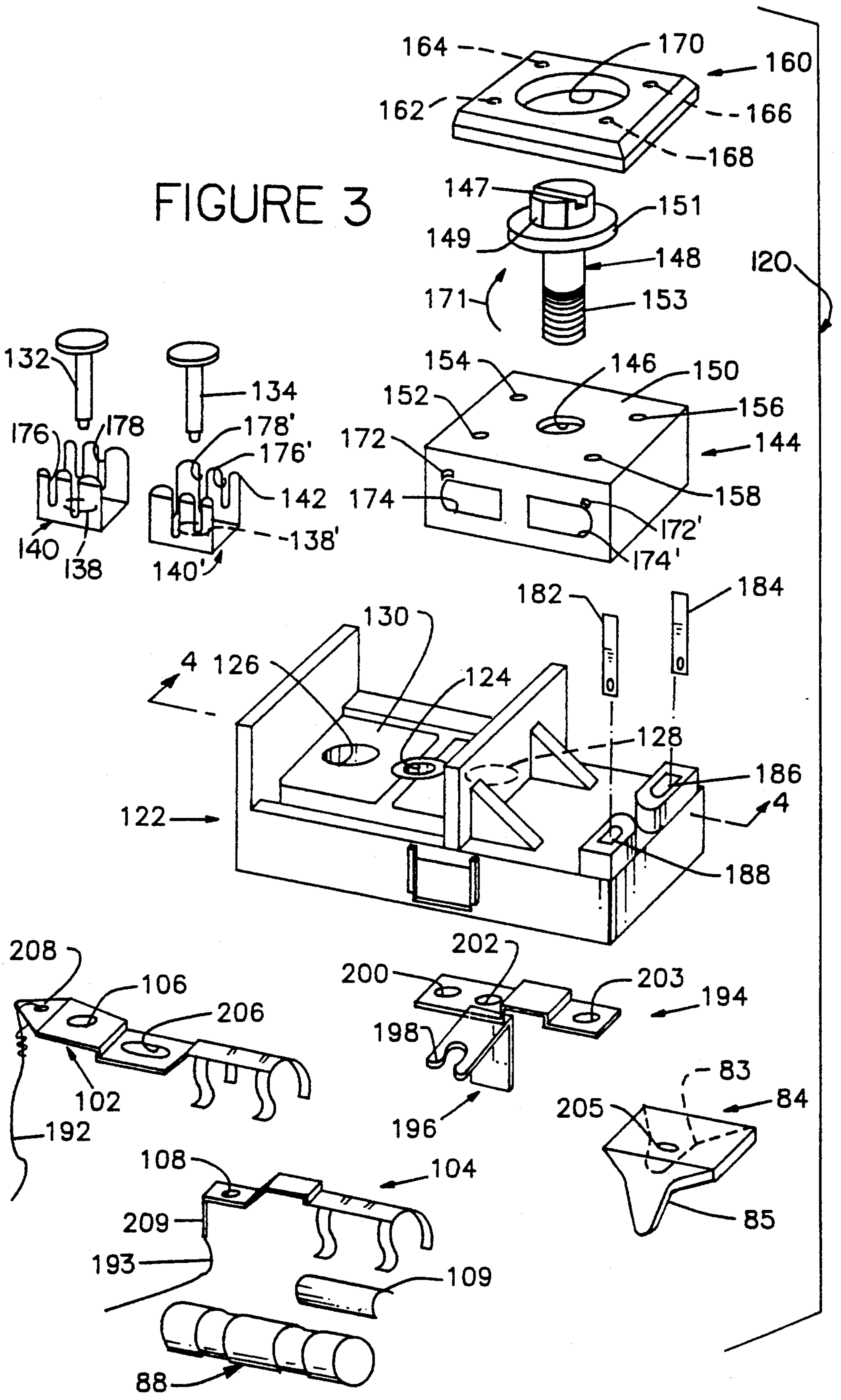
FIG. 3 is an exploded isometric view of an alternative embodiment of the present invention.

Referring now to FIG. 3, which is an alternative embodiment of the weatherproof station protection module 10 disclosed in FIGS. 1 and 2 and it is similar in some respects to U.S. Pat. No. 5,153,911, issued to Thomas J. Smith on Oct. 6, 1992, particularly the weatherproof terminal arrangement which is seen to include a hollow housing 122 and is provided with a through aperture 124 and another pair of apertures 126 and 128, preferably all positioned on approximately one half of the top surface 130 of the hollow housing 122. A pair of rivets or studs 132 and 134 are adapted to be received in apertures 136 and 138 provided in U-shaped channel members 140 and 140' and then into apertures 126 and 128, respectively, wherein they extend into the hollow portion of housing 122.

Rivets 132 and 134 are chosen to extend into the hollow opening of housing 122 and are held in position as will be described hereinafter.

An insulated cap member 144 is provided with a through aperture 146 on its top surface that is adapted to receive a bolt member 148 provided with an extended circumferential ledge 150 which is a larger diameter than the aperture 146 provided in insulated cap member 144. The top surface 150 of insulated cap member 144 is also provided with four apertures 152, 154, 156 and 158 adapted to receive a cover 160 provided with four protrusions 162, 164, 166 and 168 provided on the top cover 160. A centrally disposed aperture 170 smaller in diameter than the diameter of the lip 151 provided on the bolt member 148 but greater than the diameter of the bolt head 149 provided on the bolt member 148, is also provided on top cover 160. Thus, when cap member 160 is mated to insulated cap member 144 the bolt member 148 is held captive. The opposite distal end 153 of bolt member 148 is threaded and is adapted to be received into threaded aperture 124. Thus, rotating the bolt member 148 in the direction of arrow 171 moves the entire cap member 144 in a downwardly direction, the function which will be explained hereafter.

Insulated cap member 144 is also provided with two pairs of apertures 172, 174 and 172' and 174' which are adapted to receive insulated wires, not shown, therein of varying wire sizes and are positioned to be in direct alignment with shearing slots 176 and 178 and 176' and 178' provided in the U-shaped channel members 140 and 140'. Thus, in operation, when a wire is inserted into aperture 174 for example, extending clear through shearing slots 178 provided in the U-shaped channel 140 the insulation on the wire will be sheared when bolt head 149 is rotated in the direction of arrow 171 (clockwise) causing an internal platform 180 (see FIG. 4) to be received into the opening in the U-channel 140 between the arms thereof. In a like manner a wire inserted into aperture 174' will be sheared in the same manner by shearing channel 178' provided in U-shaped channel member 140'.

Figure 4:
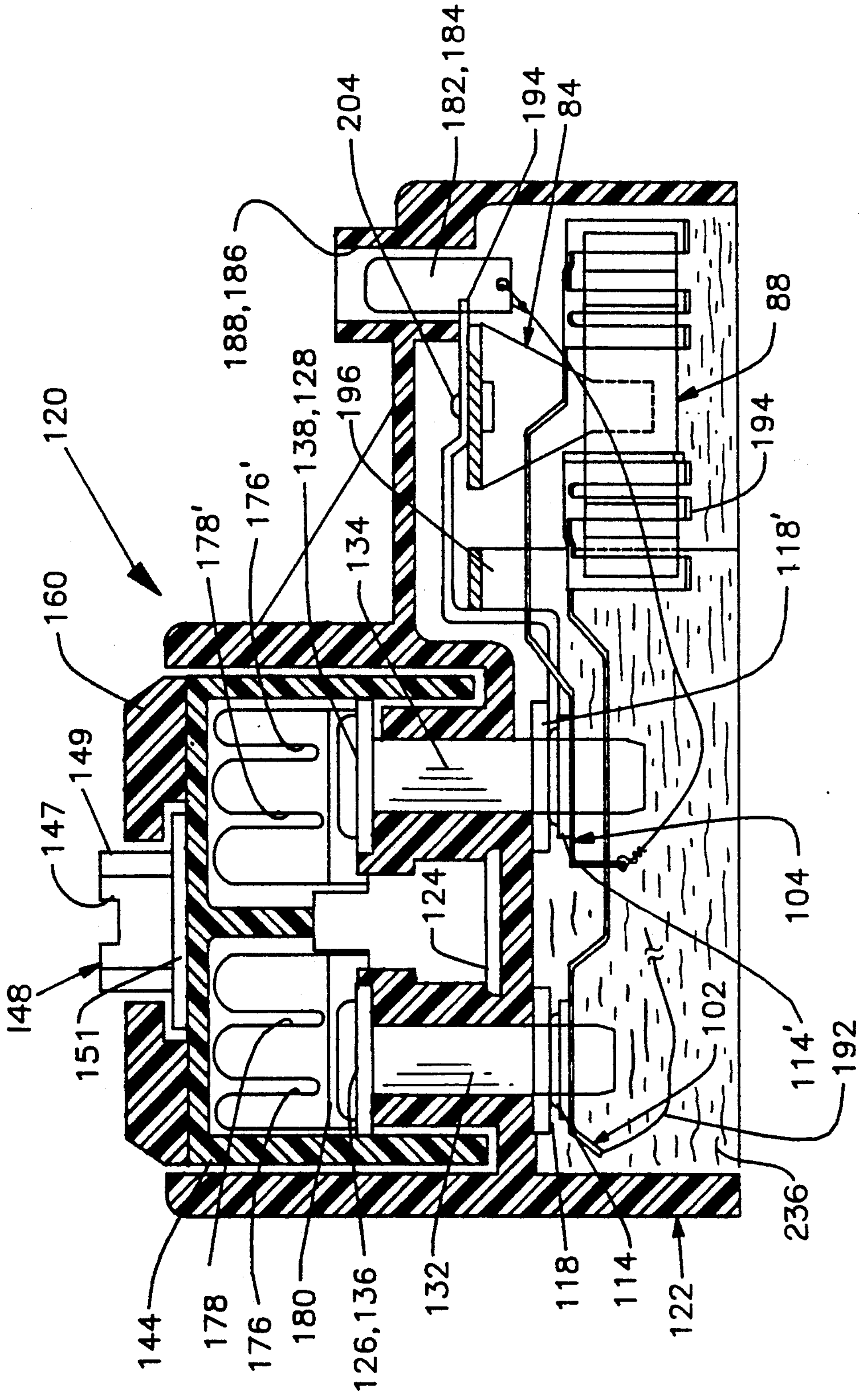
FIG. 4 is an enlarged cross-sectional view taken along the line 4—4 of FIG. 3.

The bolt member 148 may be provided with a hexagonal head 149 or may include a conventional slot 147 as shown in FIGS. 3 and 4.

A pair of test point terminals 182 and 184 are inserted into test point apertures 186 and 188 and are frictionally held therein. They are connected to each one of the line terminals by conductive wires 190 and 192 (see FIG. 4).

Bracket 194 is brazed onto the ground lug 196 in a conventional manner or may be fabricated as a single component. Aperture 198 provided in the ground lug 196 may be connected to a ground terminal, not shown, by means of the slot 198 provided therein. The bracket 194 is provided with apertures 200, 202 and 203. A rivet 204 (see FIG. 4) passed through aperture 205 in finger member 84 and through aperture 203 in the ground bracket 194 is peened over, in a conventional manner, and connects them together as an electrically conductive contact terminal. Apertures 106 and 200 of the brackets 102 and 104 respectively, are adapted to receive the distal ends of studs 132 and 134 therein and is insulated from these studs by an insulating shoulder washer or spacer 114.

A pair of gripping brackets 102 and 104 are provided with apertures 106 and 108, respectively, and are adapted to be received on studs 132 and 134, respectively. The fingers on brackets 102 and 104 are adapted to receive and retain therein the overvoltage protection device 88 and also may include a thermoplastic between the brackets 102 and 104 and the overvoltage protection device 88 so that if the overvoltage protection device were to overheat they are provided with a fail-short device, since the thermoplastic 109 would melt providing a direct connection to ground, via the brackets 102, 104 and 196 and finger members of those brackets. This overheating protection or fail short as it is known, may be utilized with any of the embodiments disclosed herein. Aperture 206 provided on bracket 102 provides a clearance for bracket 104 so that there is no electrically conductive connection between the two.

Kapton spacers, or the like, 118 and 118, are also utilized in this embodiment as well as the others in order to provide overvoltage protection in a back-up path should the overvoltage protection device fail and as stated earlier and it is preferably approximately 3 mils thick.

The brackets 102 and 104 in the present embodiment are provided with extending portions 208 and 209 onto which wires 192 and 193 may be soldered, respectively. The other end of wires 192 and 194 are soldered to the ,test terminals 182 and 184, respectively.

Once the embodiments have been completely assembled the air spaces may readily be filled with an insulating epoxy (potting compound) and the air gaps found in the cap member 144 may be filled with a gel or non-conductive grease including the test point terminal area. When test voltages have to be read the probe on the meter may be used to pierce the gel or grease.

Figure 5:
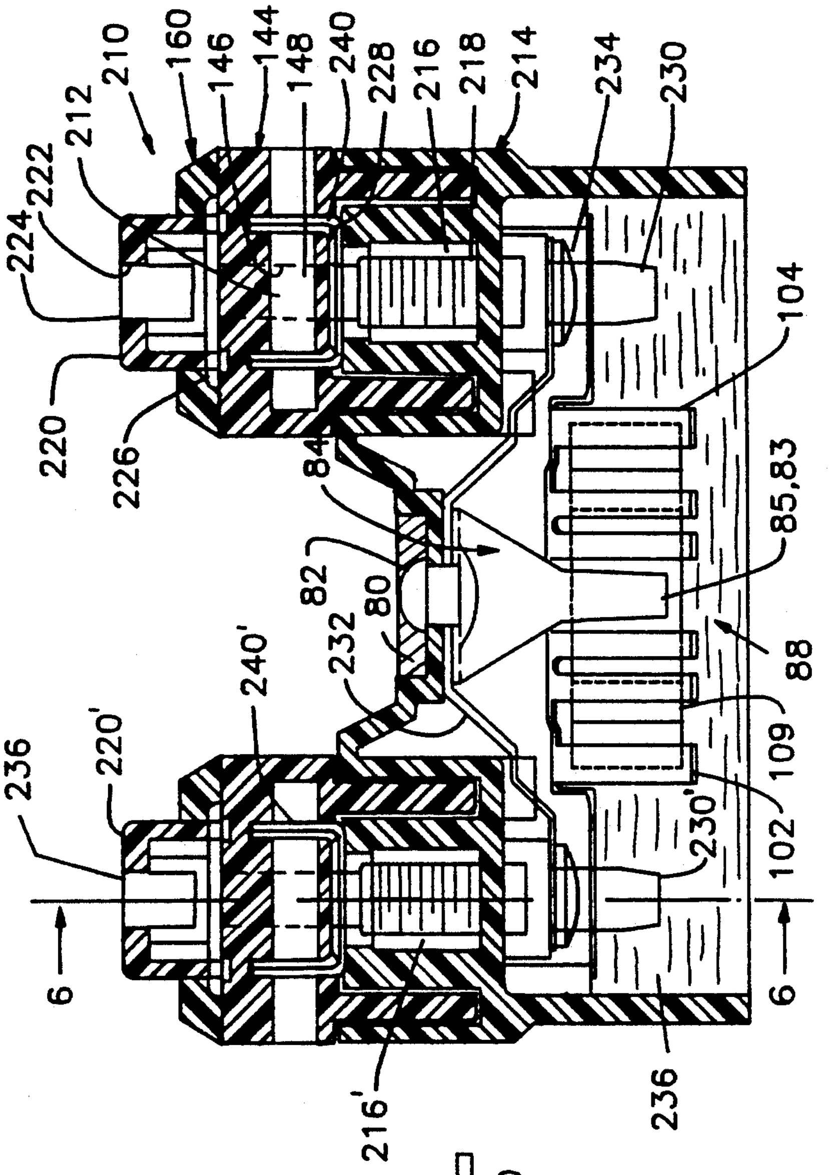
FIG. 5 is a cross-sectional view in elevation of a second alternative embodiment.
Figure 6:
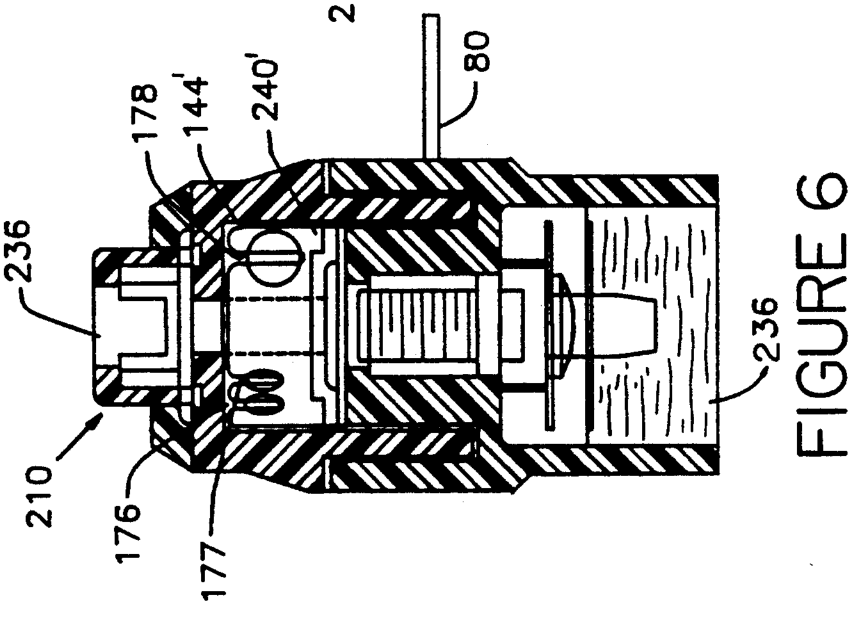
FIG. 6 is a cross-sectional view taken along the line 6—6 of FIG. 5.

Referring now to the embodiments disclosed in FIGS. 5 and 6 it can be seen that there are many features that are similar to the embodiments that have been disclosed earlier. In the embodiment in FIG. 1 the connecting wires, not shown, are inserted into the apertures along an axis which is in line or parallel to the overvoltage protection device 10. In the embodiment disclosed in FIG. 3 the wires are inserted along an axis transverse to the longitudinal axis of the embodiment disclosed therein. In the embodiment disclosed in FIGS. 5 and 6 the wires are to be inserted along an axis which runs parallel with the axis of the overvoltage protection module 210.

Although only one line terminal will be described in detail in FIG. 5 it is to be understood that the other line terminal is identical.

The weatherproof station protection module 210 as shown in FIG. 5 is seen to have an insulated cap member 144 which is provided with an aperture 146 adapted to receive a bolt 212 therein. A hollow housing 214 has a threaded insert provided and a pair of threaded inserts 216 (and 216') adapted to receive the distal threaded end 218 of bolt 212 therein. A cap 160 is affixed to the top surface of the insulated cap member 144 in the same manner as described earlier, however, a cover member 220 (and 220') which has a centrally disposed aperture 222 provided therein exposing a recess 224 provided in the opposite distal end of the bolt 212. The cover member 220 is molded covers so that the lip portion 226 of the bolt 212 and still fit beneath the cover 160, thus, maintaining as captive the cover 220 and the bolt 212 as part of the insulated cap member 144. The U-shaped channel member 240 (and 240') includes a plurality of shearing slots 176 and an additional slot 177 suitable for shearing the insulation from a second small diameter wire. The threaded insert 216 is also provided with a collar portion 228 which may be peened over and retained the U-shaped channel member to the hollow housing 214.

The operation of this embodiment of the weatherproof terminal is identical to the weatherproof terminal described together with FIG. 4.

The threaded insert 216 provides electrical conductive contact between the bolt 220 at one end and at the other end of the threaded insert 216 provides the terminals for the remaining mounting of the hardware, such as gripping brackets 102 and 104, the overvoltage protection device 188 and the finger member device 84 which grips the overvoltage protection device at its center or ground terminal. The ground terminal 80 is riveted by means of rivet 82 to the finger member 84 as described earlier. Bracket 102 connects the overvoltage protection device 88 to one conductive terminal 230 provided on the opposite distal end of threaded insert 216. Bracket 102 is connected to 216' and bracket 104 is connected to terminal 230 by forcing an aperture provided in the brackets on the distal end of the terminals 230 and 230'.

The arrangement of parts or components on the terminal 230 is exactly the same as that described with regard to the components for the rivet or stud 134 or 134' and includes a Kapton washer of approximately 3 mils thick between the ground bracket 232 and terminal 230 (and 230') including an insulating insert to prevent the ground terminal 232 from shorting to the terminal 230. A pressure ring 234 maintains the components in position. Once the module has been assembled potting compound 236 may be used to fill the air gaps and the lower portion of the housing 214 and a nonconducting grease or gel may be used to fill the areas around the U-shaped channel bracket member 240 as well as the test terminals to make the weatherproof station protector module weatherproof.

In operation, the wires, not shown, connected to the communication lines to be protected are inserted into apertures 32, 34 and 36 depending upon the wire size. The other lines to be protected would be inserted into 32', 34' and 36' or in the alternative embodiments, inserted into apertures 172 and 174 or 172' and 174' or into apertures 176, 178 or 180 and for the other line to be protected the apertures 176', 178' and 180'. The appropriate aperture would be used depending upon the wire size to be connected to the communication line. In all the embodiments, by turning the hexagonal nut or slot in a clockwise direction, the shearing channels cut through the insulation on the wire and permits electrical conductive contact in the U-channel member or electrically conductive contact with the cylindrically shaped members 28 or 28'.

As explained earlier, each terminal is connected to one end of the overvoltage protection device 88 so that the communication lines may be protected for any overvoltage surges. In addition, thermoplastic 109 interposed between the terminals and ground provide protection for thermal overheating of the overvoltage protection device 88 should it occur.

Hereinbefore has been disclosed alternative embodiments of a weatherproof station protector module which protects a technician from being exposed to any voltage at the time he is making the connections to the module. The modules may utilize, as stated earlier, a three terminal gas filled overvoltage protector device or a pair of two terminal solid state devices and is designed to be disposable once an overvoltage has occurred. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention what is claimed is:

1. A weatherproof station protector module for communication systems, comprising:

a) a hollow housing having a top surface and an open bottom, said top surface being provided with a pair of terminal receiving means with a centrally disposed through aperture;

b) a pair of weatherproof line terminals disposed in said top surface extending into said hollow housing and a ground terminal extending into said hollow housing, said pair of line terminals including;

i) an outer insulator member, ii) an inner insulator member, and iii) an electrically conductive tubular shaped member in electrically conducting contact with one of said pair of line terminals provided with a plurality of horizontally disposed insulator cutting slots adapted to be retained by said terminal receiving means, said electrically conductive tubular member being adapted to retain said inner insulator member, said outer insulator member being adapted to be retained upon said inner insulator member, said inner insulator member, said outer insulator member and said electrically conductive member being provided with a plurality of through apertures in alignment and adapted to receive a plurality of insulated wires therein; and c) holding assembly means affixed to said ground terminal within said hollow housing for receiving a surge arrester means;

d) surge arrester means disposed in said holding assembly means having at least a pair of electrodes, one of said electrodes being in electrically conductive contact with said ground terminal, the other of said electrodes being in electrically conductive contact with one of said pair of line terminals; and e) means adapted to cooperate with said hollow housing open bottom for sealing said housing;

wherein when said outer insulator is rotated relative to said electrically conductive member the insulation of said wires are sheared connecting said wires together.

2. A weatherproof station protector module for communication systems, according to claim 1, further including surge arrester back-up means disposed between said surge arrester and said holding assembly means.

3. A weatherproof station protector module for communication systems according to claim 1, wherein said outer insulated member and said electrically conductive member are provided with apertures suitable for receiving insulated wires of more than one size.

4. A weatherproof station protector module for communication systems, according to claim 1, wherein said means for sealing is a potting compound, said potting compound being applied to fill the voids in said station protector module.

5. A weatherproof station protector module for communication systems, according to claim 1, further including a pair of test terminals, each one of said pair of test terminals being conductively connected to one of said line terminals.

6. A weatherproof station protector module according to claim 1, wherein said hollow housing is elongated having a longitudinal axis and a transverse axis and the apertures provided in said pair of weatherproof line terminals are facing transverse to the longitudinal axis of said housing.

7. A weatherproof station protector module according to claim 1, wherein said hollow housing is elongated having a longitudinal axis and a transverse axis and the apertures provided in said pair of weatherproof line terminals are facing parallel to the longitudinal axis of said housing.

8. A weatherproof station protector module according to claim 1, wherein said weatherproof line terminals retain said insulated wires inserted therein with a rotary motion of said outer insulator member.

9. A weatherproof station protector module for communication systems, comprising:

A) a lower generally rectangularly shaped hollow housing said housing being made of an insulator having a top surface and an open bottom, said top surface being provided with terminal receiving means having a threaded aperture;

B) weatherproof line terminal means disposed upon said top surface of said lower hollow housing and a ground terminal extending into said lower hollow housing, said line terminal means including;

a) an upper generally rectangularly shaped hollow housing, b) a pair of generally U-shaped electrically conductive contacts disposed on said top surface of said lower hollow housing adapted to be received into said upper housing, said U-shaped electrically conductive contacts including;

i) at least one slot transverse to the longitudinal axis of said lower hollow housing disposed in each of the arms thereof, in alignment, and adapted to receive the conducting portion of said insulated wire therein;

C) captive threaded bolt means adapted to be received into a cooperating thread insert disposed in said top surface of said lower hollow housing;

D) holding assembly means affixed to said ground terminal within said lower hollow housing for receiving a surge arrester means; and E) surge arrester means disposed in said holding assembly means having at least a pair of electrodes, one of said electrodes being in electrically conductive contact with said ground terminal, the other of said electrodes being in electrically conductive contact with one of said pair of line terminals;

wherein, when said captive bolt means is rotated relative to said lower hollow housing electrically conductive contacts, the insulation of said wires are sheared connecting said wires together.

10. A weatherproof station protector module for communication systems, according to claim 9, further including a pair of test terminals, each one of said pair of test terminals being connected to one of said line terminals.

11. A weatherproof station protector module for communication systems, according to claim 9, wherein said hollow cover means and said contact means are provided with apertures suitable for receiving insulated wires of more than one size.

12. A weatherproof station protector module for communication systems, according to claim 9, further including potting compound, said potting compound being resilient and applied to fill the voids in said hollow cover means, said hollow housing and the aperture in which said test terminals are located.

13. A weatherproof station protector module for communication systems, according to claim 9, wherein said ground terminal extends outwardly from the side of said protector module.

14. A weatherproof station protector module for communication systems, according to claim 9, further including surge arrester back up means disposed between said surge arrester and said holding assembly means.

15. A weatherproof station protector module according to claim 9, wherein said weatherproof line terminals retain insulated wires inserted therein with rotation of said outer insulator member.

16. A weatherproof station protector module according to claim 15, further including means adapted to cooperate with said lower hollow housing open bottom for sealing said housing.

17. A weatherproof station protector module according to claim 15, wherein said protector module includes a pair of line terminal means and said bolt means is disposed on both sides of said ground terminal, said ground terminal also extending transversely to said lower housing longitudinal axis.

* * * * *